United States Patent [19]

Kurematsu et al.

[11] Patent Number: 5,276,523
[45] Date of Patent: Jan. 4, 1994

[54] LIQUID CRYSTAL TELEVISION PROJECTOR WITH AUTOMATIC FOCUS

[75] Inventors: Katsumi Kurematsu, Kawasaki; Nobuo Minoura, Yokohama, both of Japan

[73] Assignee: Canon Kabushiki Kaisha, Tokyo, Japan

[21] Appl. No.: 908,834

[22] Filed: Jul. 2, 1992

Related U.S. Application Data

[63] Continuation of Ser. No. 809,227, Dec. 17, 1991, abandoned, which is a continuation of Ser. No. 665,993, Mar. 7, 1991, abandoned.

[30] Foreign Application Priority Data

Mar. 8, 1990 [JP] Japan .................................. 2-55130

[51] Int. Cl.⁵ .................................. H04N 5/74
[52] U.S. Cl. .................................. 358/236; 358/250; 353/101
[58] Field of Search .................... 358/231, 236, 60, 61, 358/250; H04N 5/74

[56] References Cited

U.S. PATENT DOCUMENTS

| | | | |
|---|---|---|---|
| 3,628,857 | 12/1971 | Harvey | 353/69 X |
| 4,386,833 | 6/1983 | Hirose | 353/101 X |
| 4,415,244 | 11/1983 | Daly et al. | 353/69 X |
| 4,494,839 | 1/1985 | Brueckner | 353/101 |
| 4,560,999 | 12/1985 | Tokuhara | 358/61 |
| 4,988,188 | 1/1991 | Ohta | 353/122 |
| 4,989,076 | 1/1991 | Owada et al. | 346/160 |
| 5,136,397 | 8/1992 | Miyashita et al. | 358/236 |

FOREIGN PATENT DOCUMENTS 61-13885  1/1986  Japan .
62-125791  6/1987  Japan .
63-106785  5/1988  Japan .
63-253342  10/1988  Japan .

*Primary Examiner*—Mark R. Powell
*Attorney, Agent, or Firm*—Morgan & Finnegan

[57] ABSTRACT

There is disclosed a video projector provided with automatic focusing function. An image is generated on a liquid crystal light valve according to the video signal, and this image is projected through a projection lens system. The aberration between the focal plane of the projection lens system and the projection surface, such as a screen, is detected, and the focal plane is shifted according to thus detected aberration, in such a manner that the focal plane coincides with the projection surface or screen.

24 Claims, 3 Drawing Sheets

LIQUID CRYSTAL TELEVISION PROJECTOR WITH AUTOMATIC FOCUS

This is a continuation of co-pending application Ser. No. 07/809,227, filed on Dec. 17, 1991, now abandoned, which is a continuation of Ser. No. 07/655,993, filed Mar. 7, 1991, now abandoned.

BACKGROUND OF THE INVENTION

1. Field of the Invention

The present invention relates to a projection television receiving apparatus, and more particularly such apparatus capable of generating an image corresponding to a video signal by means of a light modulator such as a liquid crystal light valve, and projecting the image into a projection plane such as a screen.

2. Related Background Art

Image projectors utilizing a liquid crystal light valve are already disclosed for example in the Japanese Patent Application Laid-Open No. 61-13885, No. 62-125791 and No. 63-106785, but manual focusing of the image on the screen is required in these projectors because they lack the automatic focusing function which is already employed, for example, in the still cameras, video cameras, slide projectors or the like.

On the other hand, the present applicant already proposed, in the Japanese Patent Appln. Laid-Open No. 63-253342, a projector capable of measuring the distance between the projector itself and the screen by a range finding device utilizing infrared light or ultrasonic wave, identifying the image size on the screen from the result of distance measurement, and regulating the luminance of the projected image according to the image size. However this projector still requires manual focusing the image on the screen, since it lacks the automatic focusing function.

Recently there are commercialized projection television receiving apparatus utilizing portable projectors, but the user can enjoy a clear image only after exactly positioning the projector and the screen and focusing the image onto the screen.

SUMMARY OF THE INVENTION

The object of the present invention is to provide an improved projection television receiving apparatus capable of easily providing a clear image.

The above-mentioned object can be attained, according to the present invention, by a projection television receiving apparatus provided with image generating means for generating an image according to a video signal; means for projecting the image onto a focal plane; means for detecting the aberration of the focal plane from a projection surface; and focusing means for shifting the focal plane in response to a signal from the detecting means, thereby bringing the focal plane to a position substantially coinciding with the projection surface.

The detecting means may be composed of a known distance measuring utilizing light such as infrared light, or ultrasonic wave.

Also the focusing means may assume various forms, such as a device with a mechanism for axially moving all or a part of the optical system of the projecting means, a device with a mechanism for axially moving a display plane of the image generating means, a device with a mechanism for axially moving the image generating means and the projecting means, or a device equipped with at least two of the mechanisms.

In a preferred embodiment, the projection television receiving apparatus of the present invention is provided with supply means for supplying a visible light; image generating means for generating an image by modulating the visible light according to a video signal; means for projecting said image on a focal plane; directing means for directing an invisible light to a projection surface; photoelectric converting means for receiving the invisible light reflected by the projection surface and generating a signal corresponding to the position of the projection surface; and means for driving at least a part of projecting means in response to the signal, in such a manner that the focal plane substantially coincides with the projection surface.

DETAILED DESCRIPTION OF THE PREFERRED EMBODIMENTS

Figure 1:
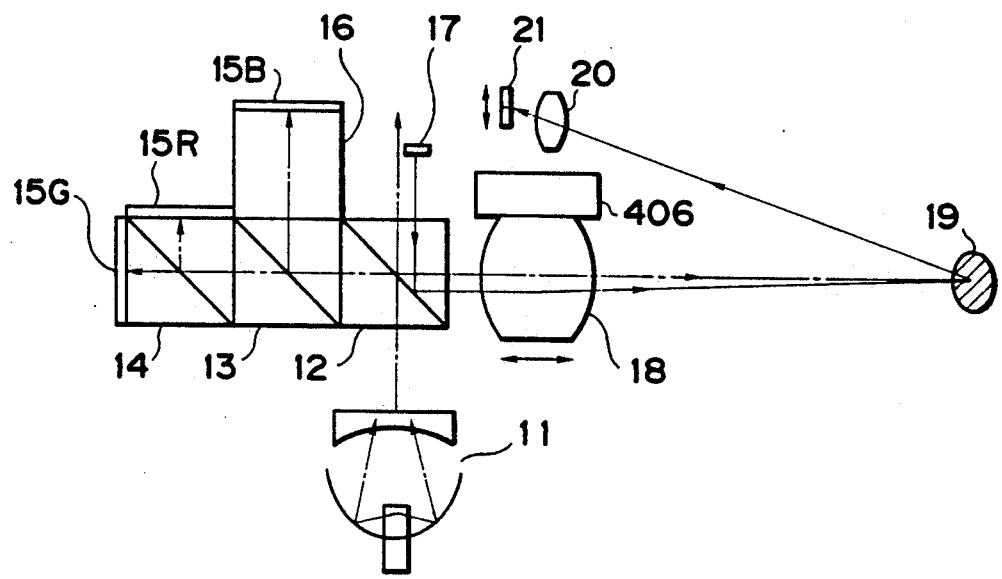
FIG. 1 is a view of a first embodiment of the present invention.

FIG. 1 illustrates a first embodiment of the present invention.

Among the white light emitted from a light source 11, the P-polarized light is transmitted by a polarizing beam splitter 12 and is absorbed by an unrepresented absorbing plate, and the S-polarized light alone is reflected by the polarizing beam splitter 12. The reflected S-polarized light is separated by dichroic mirrors 13, 14 into color components of R (red), G (green) and B (blue), which are respectively guided to reflective liquid crystal panels 15R, 15G, 15B.

The liquid crystal panels 15R, 15G and 15B are composed of liquid crystal light valves of ECB (electrically controlled birefringence) type, capable of rotating the polarizing plane of incident light (S-polarized light in this case) according to the voltage applied to each pixel based on the video signal. Consequently the lights reflected from the liquid crystal panels 15R, 15G, 15B have different polarized light components for each pixel according to the image signal. These reflected lights are again synthesized by the dichroic mirrors 13, 14 and return to the beam splitter 12. The P-polarized components in the reflected lights are transmitted by the beam splitter 12 and are projected by a projection lens 18 into an unrepresented screen (projection member), while the S-polarized components are reflected by the beam splitter 12 and return to the light source 11. Thus the beam splitter 12 functions both as the polarizer and the analyzer, so that the liquid crystal panels 15R, 15G, 15B need not be equipped with polarizing plates and the entire structure can be simplified. The two dichroic mirrors 13, 14 are provided in order in the direction of reflection of the S-polarized light by the polarizing beam splitter 12. The dichroic mirror 13 reflects, among the incident light, the B component and components of shorter wavelength upwards in the drawing. The dichroic mirror 14 reflects, among the incident light, the R component and components of longer wavelength upwards but transmits other components. The liquid crystal panel 15R for the R component is provided on an end face of the dichroic mirror 14 where the components of R and longer wavelength are guided by reflection, while the liquid crystal panel 15G for the G component is provided on another end face of the dichroic mirror 14 where the transmitted light is guided. On an end face of the dichroic mirror 13 where the components of B and shorter wavelength are guided by reflection, there are provided a glass spacer 16 for making the optical path length of the B component light same as that of the reflected R and G components, and a liquid crystal panel 15B in succession in the proceeding direction of the B component light. A light-emitting element 17 constituting an invisible light source is positioned opposite to the visible light source 11, across the polarizing beam splitter 12, and emits an invisible infrared light beam.

Among the infrared light beam emitted from the light-emitting element 17 is reflected by the polarizing beam splitter 12, emerges therefrom together with the lights reflected by the liquid crystal panels 15R, 15G, 15B and is projected by the projection lens 18 onto the projection member 19. The projection lens system 18 can be moved entirely, along the optical axis from the beam splitter 12 toward the projection member 19, by a driving system 406 which thus achieves the focusing operation. A divided sensor 21, composed of a two-area infrared sensor, is provided for receiving the infrared light reflected by the projection member 19, and is rendered movable in a direction perpendicular to the moving direction of the projection lens system 18. Between the divided sensor 21 and the projection member 19, an infrared lens 20 is provided for guiding the infrared light, reflected by the projection member 19, into the divided sensor 21. The above-explained projection lens system 18 and the divided sensor 21 are controlled by an unrepresented control unit. The above-explained system is mounted in an unrepresented case and rendered portable, and the systems in the subsequent embodiments are likewise constructed.

In the following there will be explained the function of the present embodiment.

The infrared light beam emitted by the light-emitting element 17 enters the polarizing beam splitter 12, and the S-polarized component is reflected therein as explained above. The reflected infrared light beam is projected by the projection lens system 18 onto the projection member 19. A part of the infrared light reflected by the projection member 19 is received by the infrared lens 20, and forms focused spots on a light receiving face of the divided sensor 21. The positions of the spots vary according to the position of the projection member 19 with respect to the lens system 19 or the focal plane thereof. The control unit moves the divided sensor 21 toward an in-focus point where the two areas of the divided sensor 21 provide equal outputs, thus detects the distance to the projection member 19 from the position or moving amount of the sensor 21, and moves the projection lens system 18 by the driving system 406 according to the result of the detection, thereby shifting the focal plane of the lens system 18 and focusing the image on the projection member 18.

As explained in the foregoing, the present embodiment effects infrared active automatic focusing control. The control system for the automatic focusing is simplified by constructing a part of the optical system therefor in common with the projection system of the liquid crystal video projector.

Figure 2:
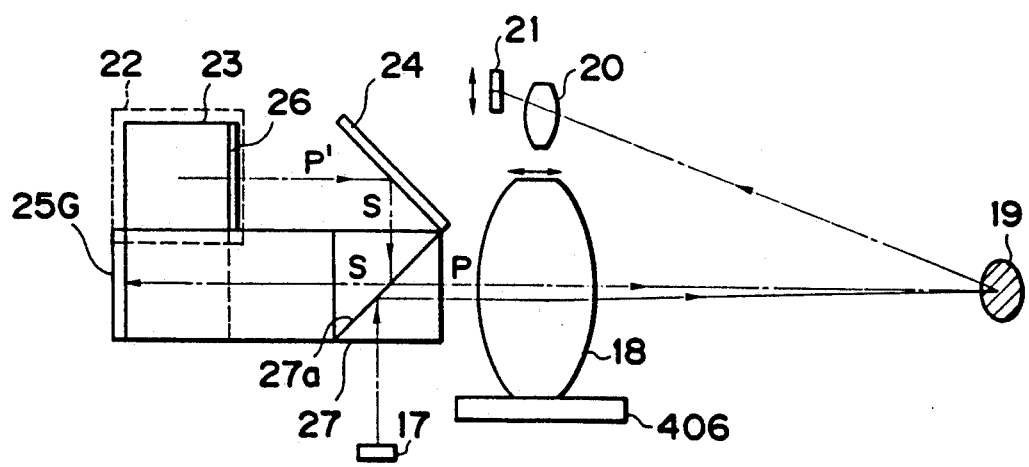
FIGS. 2 and 3 are respectively a lateral view and a plan view of a second embodiment of the present invention.
Figure 3:
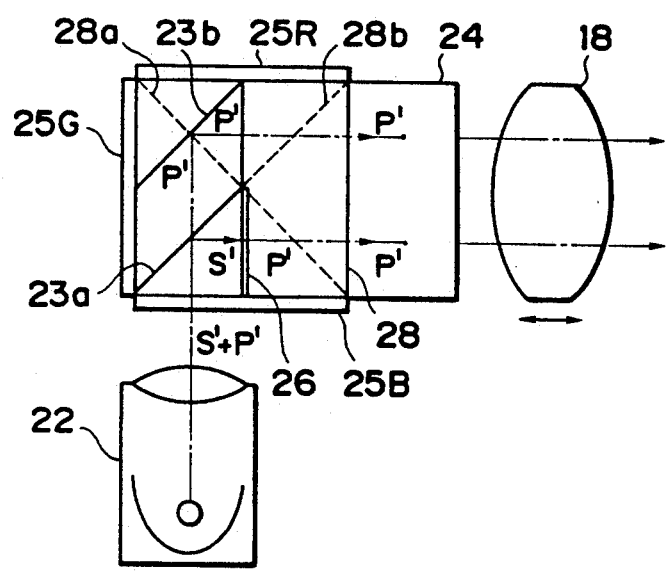

FIGS. 2 and 3 are respectively a lateral view and a plan view of a second embodiment of the present invention.

The present embodiment employs a cross dichroic prism 28 for separating and synthesizing the color component lights of R, G, B, and a polarizing beam splitter 23 and a λ/2 plate 26 for conditioning the polarized state of the lights entering the cross dichroic prism 28. Other components, such as the projection lens system for projecting the synthesized light onto the projection member, the light-emitting element for detecting the distance to the projection member 19 (or aberration of the focal plane from the projection member), the infrared lens and the divided sensor are same as those in the first embodiment shown in FIG. 1, so that they are numbered same as in the first embodiment shown in FIG. 1 and will not be explained further.

On three lateral faces of the cross dichroic prism 28 there are respectively provided reflective liquid crystal panels 25R, 25G, 25B for R, G, B colors. The liquid crystal panels, can be of the aforementioned ECB type capable of rotating the polarizing plane of the incident light according to the voltage applied corresponding to the image signal, or of the 45° twisted nematic (TN) type. Close to a light-emitting and light-receiving end face of the cross dichroic prism 28 there is provided a polarizing beam splitter 27, and a mirror 24 is provided thereabove. Also on the cross dichroic prism 28, there is provided a polarizing beam splitter 23 having a total reflecting plane 23b parallel to an action plane 23a and haivng a parallelogrammic structure when seen from above, as shown in FIG. 2. The action plane 23a is formed at the side of a light source 22, and a λ/2 plate 26 is provided at the emerging direction of the reflected light.

In the following there will be explained the function of the present embodiment.

A white parallel light beam, from a light source 22 enters the beam splitter 23, and is separated by the action plane 23a into a reflected S-polarized light S' and a transmitted P-polarized light P'. The reflected S-polarized light is subjected, upon passing the λ/2 plate 26, to a rotation of the polarizing plane by 90°, thereby becoming a P-polarized light P', and proceeds to the mirror 24. On the other hand, the P-polarized light P' transmitted by the action plane 23a is totally reflected by the total reflecting plane 23b and proceeds to the mirror 24. Thus the light beam from the light source 22 is totally converted into the P-polarized light P' by means of the polarizing beam splitter 23 and the λ/2 plate 26, and proceeds to the mirror 24. The P-polarized light P' is totally reflected by the mirror 24 and enters the polarizing beam splitter 27.

As the polarizing beam splitters 23, 27 are so arranged that the action planes 23a, 27a are inclined with respect to the mutually orthogonal axes, the P-polarized light from the mirror 24 becomes S-polarized to the beam splitter 27 and is reflected therein toward the adjacent cross dichroic prism 28 (indicated by a beam S).

The S-polarized light thus entering the cross dichroic prism 28 is separated by a dichroic mirror plane 28a (reflecting R light) and a dichroic mirror plane 28b (reflecting B light) into the colored lights R, G, B which are respectively projected onto liquid crystal panels 25R, 25G, 25B for R, G, B colored lights. These liquid crystal panels are adapted to rotate the polarizing plane of the incident light according to the video signal, as explained above. Since the incident lights to the liquid crystal panels are S-polarized in the present embodiment, the reflected light from each pixel contains the P-polarized component according to the pixel signal. Such reflected lights of different colors are synthesized by the cross dichroic prism 28 and re-enters the polarizing beam splitter 27. The splitter 27 functions as an analyzer, and the P-polarized light transmitted therein is projected by the projection lens system 18 onto the projection member.

On the other hand, an infrared light beam for automatic focusing is emitted by a light-emitting element 17 and enters the polarizing beam splitter 27, in which the S-polarized component alone is reflected therein. The reflected infrared light is projected by the projection lens system 18 onto the projection member 19. The automatic focusing operation is conducted in the same manner as in the first embodiment. In this manner, also in the liquid crystal video projector employing a cross dichroic prism, an infrared active auto focusing system can be realized as in the first embodiment.

Figure 4:
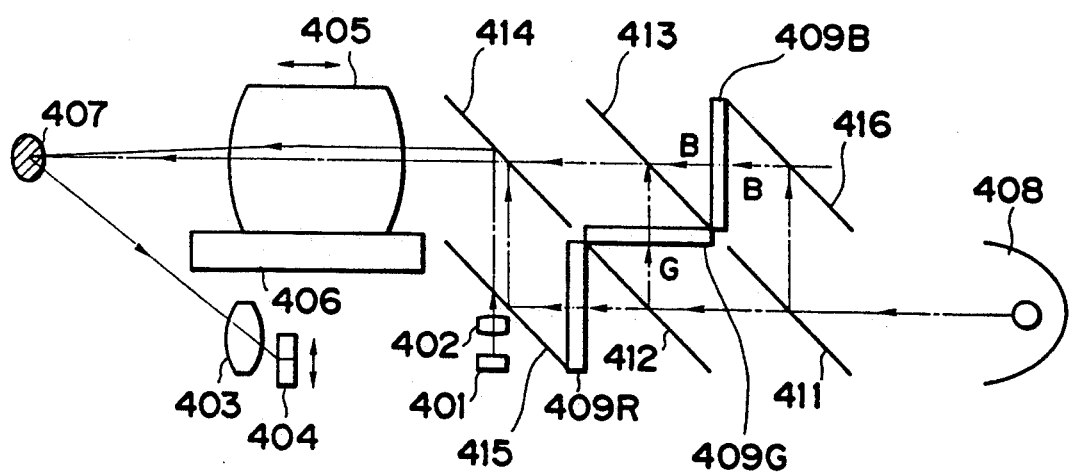
FIGS. 4 to 6 are views respectively showing third to fifth embodiment of the present invention.

FIG. 4 illustrates the structure of a third embodiment of the present invention.

In contrast to the image formation by reflective liquid crystal light valves in the first and second embodiments, that in the present embodiment is achieved by transmissive liquid crystal light valves. The present embodiment is composed of a light-emitting element 401 for emitting an infrared light beam; an infrared light projecting lens 402; an infrared light receiving lens 403; a divided sensor 404 consisting of a two-area infrared sensor; a projection lens system 405; a drive system 406 for driving the projection lens system 405; a projection member 407; a light source 408; liquid crystal panels 409R, 409G, 409B for forming images for R, G, B colors and consisting of known 90° TN light valves (with polarizers and analyzers) for rotating the polarizing plane of the incident light by 90° according to the video signal; a dichroic mirror 411 for reflecting the blue light; a dichroic mirror 412 for reflecting the light of green and shorter wavelength; a dichroic mirror 413 for reflecting the light of green and longer wavelength; a dichroic mirror 414 for reflecting red and infrared light; a cold mirror 415; and a mirror 416.

The projection lens system 405 is rendered movable by the drive system 406, bewteen the dichroic mirror 414 and the projection member 407. The divided sensor 404 is rendered movable in a direction perpendicular to the moving direction of the projection lens system 405. The functions of the drive system 406 and the divided sensor 404, and the processing of the sensor output signals are conducted, as in the first embodiment, by an unrepresented control unit.

The projection system of the present embodiment will be explained in the following.

A parallel white light beam emitted from the light source 408 is separated by the dichroic mirrors 411, 412 into color component lights R, G, B which respectively enter the liquid crystal panels 409R, 409G, 409B. The B component light is reflected by the dichroic mirror 411 and the mirror 416 and enters the liquid crystal panel 409B. The B and G component lights, subjected to intensity modulation in the liquid crystal panels 409B, 409G and transmitted thereby, are synthesized in the dichroic mirror 413 and enter the dichroic mirror 414. The mirror 414 also receives the R component light, subjected to intensity modulation in the liquid crystal panel 409R and reflected by the cold mirror 415, and synthesizes the three color component lights, thus projecting the synthesized light through the projection lens 405 to the projection member 407.

On the other hand, the light beam emitted by the infrared light-emitting element 401 is guided by the projection lens 402 to the cold mirror 415, which transmits the infrared light. Thus the beam is transmitted by the cold mirror 415 and reaches the dichroic mirror 414. The dichroic mirror 414 is required to reflect the visible red light only if it is used for projecting the image light, but, in the present embodiment, the reflecting characteristic is extended to the infrared region in order to reflect the infrared light emitted by the light-emitting element 401. Thus the infrared light beam is reflected by the dichroic mirror 414, and is projected, through the projection lens system 405, to the projection member 407 constituting a screen. The infrared light reflected thereon is focused, by the infrared receiving lens 403, onto the divided sensor 404. The control unit moves the divided sensor 404 to an in-focus point where the two areas of the sensor 404 release mutually equal outputs as in the first embodiment, and shifts the lens system 405 according to the moving amount of the sensor, thereby bringing the focal plane of the lens system 405 to the projection member.

Figure 5:
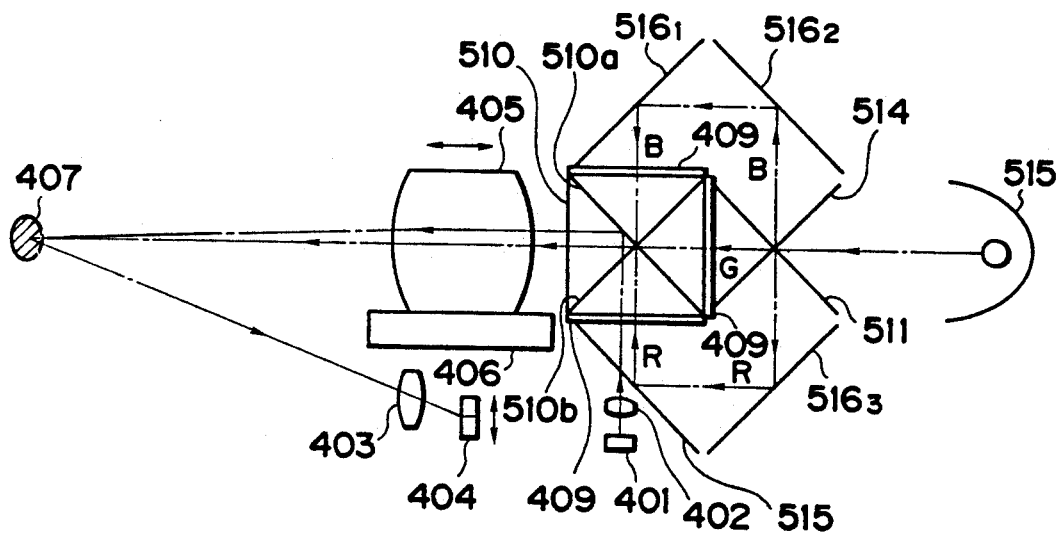

FIG. 5 illustrates the structure of a fourth embodiment.

This embodiment effects image synthesis by a cross dichroic prism. The infrared light-emitting element, the projection lens for projecting the infrared light, the three liquid crystal panels, the projection lens system for projecting the image light emerging from the cross dichroic prism onto the projection member, the driving system, the infrared receiving lens and the divided sensor are same as those shown in FIG. 4 and the automatic focusing control achieved by these components is same as that in FIG. 4. Consequently these components are numbered same as in FIG. 4 and will not be explained further.

A parallel white light beam emitted by a light source 515 is separated into the R, G and B color components by a dichroic mirror 514 reflecting the red and infrared lights, and a dichroic mirror 511 reflecting the blue light. The dichroic mirrors 511, 514 are mutually orthogonally positioned on an optical axis leading from the light source 515 to the lens system 405, whereby the B colored component and the R colored component are reflected upwards and downwards in the drawing, while the G colored component is transmitted and proceeds straight. A cross dichroic prism 510 is provided with dichroic mirror planes 510b (reflecting B color) and 510a (reflecting R color), respectively same in reflecting characteristics as the dichroic mirrors 511, 514 and respectively parallel thereto, and the liquid crystal panels 409R, 409G, 409B for R, G and B colors are adhered on three lateral faces of the prism. The B colored light reflected by the dichroic mirror 511 enters the liquid crystal panel 409B after reflections by mirrors $516_1$, $516_2$. The G colored light transmitted by the dichroic mirrors 511, 514 enters the liquid crystal panel 409G. The R colored light reflected by the dichroic mirror 514 enters the liquid crystal panel 409R, after reflections by a mirror $516_3$ and the cold mirror 515. Also the infrared light beam from the light-emitting element 401 enters the panel through the projection lens 402 and the cold mirror 515. The R, G and B image lights subjected to intensity modulation in and transmitted by the liquid crystal panels 409R, 409G, 409B are synthesized by the dichroic mirrors 510a, 510b, and projected through the projection lens system 405 onto the projection member 407.

Also the present embodiment effects automatic focusing in a similar manner as in FIG. 4, employing an infrared light beam emitted by the light-emitting element 406. Consequently the liquid crystal panel 409R is turned on (rendered transmissive) at the automatic focusing operation, either entirely or in an area receiving the infrared light beam. Thus the infrared light beam is transmitted by the panel 409R, then reflected by the dichroic mirror plane 510a and projected through the projection lens system 405. The mechanism of subsequent auto focusing control is identical with that in the third embodiment. Thus an automatic focusing system can be realized in a liquid crystal projector employing a cross dichroic prism as shown in the present embodiment.

Figure 6:
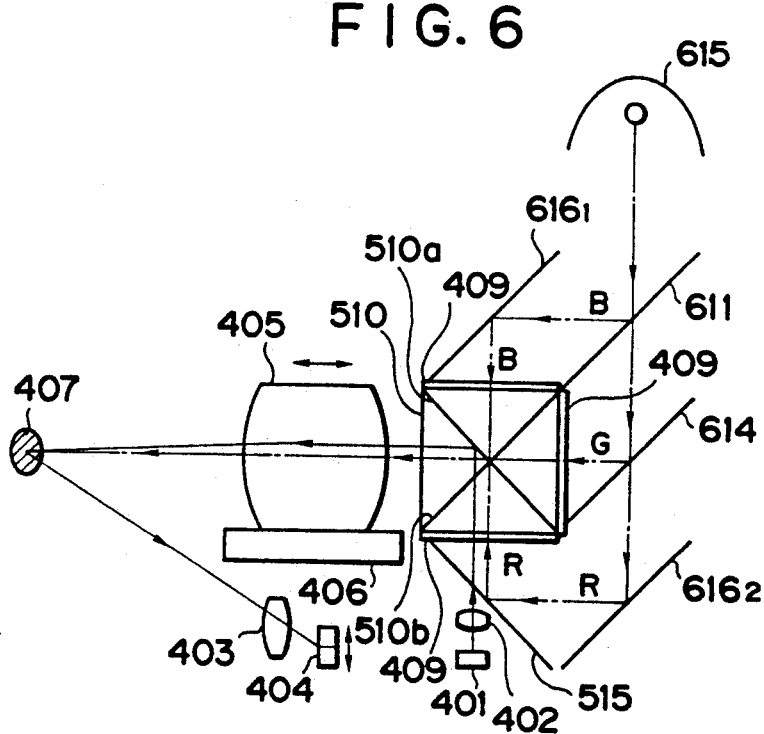

FIG. 6 illustrates the structure of a fifth embodiment of the present invention.

The present embodiment effects image synthesis with a dichroic prism as in the fourth embodiment, and is different therefrom only in the optical system for separating the light from the light source into the R, G and B color components. Other components are same as those in FIG. 5, and are therefore numbered same as in FIG. 5 and will not be explained further.

In the present embodiment, dichroic mirrors 611, 614 for color separation are arranged in succession, with same inclination angles on the output optical axis of a light source 615. The dichroic mirror 611 reflects the B colored component, like the dichroic mirror 511 and the dichroic mirror plane 510b. The dichroic mirror 614 reflects the light of green and shorter wavelength. The B colored component reflected by the dichroic mirror 611 is again reflected by a mirror $616_1$ and enters the liquid crystal panel 409B. The light of green and shorter wavelength reflected by the dichroic mirror 614 enters the liquid crystal panel 409G. The G color component alone enters the panel 409G, because the B color component is removed by the dichroic mirror 611. The R color component transmitted by the dichroic mirror 614 is reflected by a mirror $616_2$ and the cold mirror 515 and enters the liquid crystal panel 409R. Subsequently the R, G and B images are synthesized by a dichroic prism 509 in a similar manner as in FIG. 5, and automatic focusing is conducted with an infrared light beam emitted by the light-emitting element 401.

In the foregoing embodiments, the projection lens system 18 or 405 is entirely driven for shifting the focal plane thereof, but such shift of the focal plane may be achieved by driving a lens element of lens elements constituting a part of such lens system. Also a similar effect can be obtained by fixing the projecting lens system 18, 405 and moving other systems including the liquid crystal panels 15, 409 in the axial direction of the projection lens system 18, 405. When the projection lens system is fixed, the infrared light beam for auto focusing may be guided through the projection lens system but is preferably directed to the projection member 19 without the polarizing beam splitter 27 or the dichroic mirror 414. It may naturally be directed to the projection member 19 even without the projection lens system 18 or 405.

Also in the foregoing embodiments, the sensor 21 or 404 is rendered movable and the distance to the projection member 19 is determined from the moving amount of the sensor, in order to obtain the drive amount of the projection lens system 18 or 405, but it is also possible to fix the sensor and to measure the distance directly from a signal corresponding to the difference between the outputs of two areas of the sensor, namely a signal corresponding to the incident position, on the sensor, of the light reflected from the projection member. Also there may be employed similar methods employing a light position detector such as a PSD or a CCD as the sensor and detecting the incident position, on the sensor, of the light reflected from the projection member.

It is furthermore possible to determine the aberration of the focal plane of the projection lens system 18, 405 from the projection member based on the output of the sensor 21, 404 and to drive the projection lens system 18, 405 by an amount determined from the aberration.

Also for determining the distance to the projection member 19 (or aberration of the focal plane from the projection member), there may be employed an ultrasonic range finding device disclosed in the aforementioned Japanese Patent Appln. Laid-Open No. 63-253342.

The foregoing embodiments have disclosed projection television receiving apparatus for projecting a full-color image, but the present invention is likewise applicable to a projection television receiving apparatus for projecting a black-and-white image.

As explained in the foregoing, there can be provided the projection television receiving apparatus of various forms based on the concept of the present invention.

What is claimed is:

1. A projection television receiving apparatus for projecting an image on a surface, comprising:
    means for generating said image according to a video signal;
    means for projecting said image on a focal plane, said means for projecting including a projection lens system;
    means for detecting the deviation of said focal plane from said surface, said detecting means comprising a radiation source for emitting a radiation beam and a photodetector for receiving a reflected beam generated by reflection of said radiation beam by said surface, said photodetector generating a signal corresponding to the incident position of said reflected beam, said radiation beam being directed to said projection surface through said projection lens system; and
    focusing means for shifting said focal plane in response to said signal from said detecting means, thereby bringing said focal plane to a position substantially coinciding with said surface.

2. An apparatus according to claim 1, wherein said photodetector is adapted to receive said reflected beam through said projection lens system.

3. A projection television receiving apparatus for projecting an image on a surface, comprising:
    supply means for supplying visible light;
    image generating means for generating said image by modulating said visible light according to a video signal;
    means for projecting said image on a focal plane;
    directing means for directing an invisible light to said surface;
    photoelectric converting means for receiving reflected light generated by reflection of said invisible light by said surface and generating a signal corresponding to the position of said surface; and
    drive means for driving at least a part of said projecting means in response to said signal in such a manner that said focal plane substantially coincides with said surface;

wherein said projecting means comprises a projection lens system, and said directing means is adapted to direct said invisible light to said projection surface through said projection lens system.

4. An apparatus according to claim 3, wherein said invisible light is composed of infrared light.

5. An apparatus according to claim 4, wherein said image generating means comprises first, second and third liquid crystal light valves; and said supply means comprises:

a lamp emitting white light; and an optical arrangement comprising plural dichroic mirrors for separating said white light into red, green and blue lights and adapted to direct said red, green and blue lights respectively to said first, second and third light valves;

wherein said first light valve is adapted to modulate the red light to generate a red image, said second liquid crystal light valve is adapted to modulate the green light to generate a green image, and said third liquid crystal light valve is adapted to modulate the blue light to generate a blue image; and said projection lens system is adapted to project said images onto the projection surface in such a manner that said red, green and blue images mutually overlap on said surface.

6. An apparatus according to claim 5, wherein said optical arrangement comprises a polarizing beam splitter and is adapted to direct said white light to said dichroic mirrors through said polarizing beam splitter;

said first, second and third liquid crystal light valves are adapted to reflect said red, green and blue lights and to modulate the polarizing plane thereof, and to direct the reflected red, green and blue lights to said optical arrangement; and said projection lens system is adapted to project said red, green and blue images by receiving the red, green and blue reflected lights through said optical arrangement and directing said lights to said surface.

7. An apparatus according to claim 6, wherein said directing means is adapted to direct said invisible light to said projection lens system through said polarizing beam splitter of said optical arrangement.

8. An apparatus according to claim 7, wherein said directing means is adapted to direct said invisible light to said projection lens system by reflection in said polarizing beam splitter.

9. An apparatus according to claim 8, wherein said optical arrangement comprises:

a splitter for splitting said white light into P- and S-polarized lights; and means for rotating the polarizing plane of one of said polarized lights to a state substantially coinciding with the polarizing plane of the other of said polarized lights.

10. An apparatus according to claim 8, wherein said plural dichroic mirrors of said optical arrangement are composed of first and second dichroic mirrors which are positioned in mutually crossing relationship.

11. An apparatus according to claim 5, wherein said projecting means comprises plural dichroic mirrors which synthesize said red, green and blue lights from said first, second and third liquid crystal light valves and direct thus synthesized light to said projection lens system; and said projection lens system is adapted to project said red, green and blue images by receiving and directing said red, green and blue lights to said projection surface.

12. An apparatus according to claim 11, wherein said directing means is adapted to direct said invisible light to said projection lens system through at least one of said plural dichroic mirrors.

13. An apparatus according to claim 12, wherein said directing means is adapted to direct said invisible light to said projection lens system by reflection in at least one of said plural dichroic mirrors.

14. An apparatus according to claim 12, wherein said plural dichroic mirrors of said projecting means are composed of third and fourth dichroic mirrors which are positioned in mutually crossing relationship.

15. An apparatus according to claim 14, wherein said plural dichroic mirrors of said optical arrangement are composed of first and second dichroic mirrors which are positioned in a mutually crossing relationship.

16. An apparatus according to claim 12, wherein said directing means is adapted to direct said invisible light to at least one of said plural dichroic mirrors through one of said first, second and third liquid crystal light valves.

17. An apparatus according to claim 16, wherein said directing means is adapted to direct said invisible light to said plural dichroic mirrors through said first liquid crystal light valve, and said invisible light is transmitted by one of said plural dichroic mirrors and reflected by another of said plural dichroic mirrors and directed to said projection lens system.

18. A projection television for projecting an image on a surface, comprising:

means for generating said image according to a video signal;

means for projecting said image on a focal plane;

directing means for directing a focus detection light on said surface;

photoelectric conversion means for receiving said focus detection light reflected by said surface and outputting a signal corresponding to a position of said surface; and driving means for driving at least a part of said projecting means in response to said signal so that said focal plane substantially coincides with said surface, wherein at least a part of an optical path of said image to be projected by said projecting means and a part of an optical path of said focus detection light are made common.

19. A projection television for projecting an image on a surface, comprising:

a light source;

means comprising a liquid crystal light valve for forming an optical image by modulating light from said light source according to a video signal;

a projection lens for projecting said image on said surface;

a detector for photoelectrically detecting a deviation of said surface from a focal plane of said image by use of an invisible light; and a lens driving mechanism for correcting said deviation in response to a signal from said detector, wherein at least a part of an optical path of said invisible light received by said detector and a part of an optical path of said image to be projected are made common.

20. A projection television for projecting an image on a surface, comprising:
- a light source;
- a mirror assembly for separating light from said light source into a plurality of colors, said assembly including at least a dichroic mirror having a color separating function;
- means comprising a liquid crystal light valve for forming a plurality of color images corresponding to said plurality of color lights according to a video signal;
- a mirror assembly for synthesizing said plurality of color images, said assembly including at least a dichroic mirror having a color separating function;
- a projection lens for projecting said synthesized image on said surface;
- a detector for photoelectrically detecting a deviation of said surface from a focal plane of said image by use of an invisible light; and
- a lens driving mechanism for correction of said deviation in respond to a signal from said detector, wherein at least a part of an optical path of said invisible light received by said detector and a part of an optical path of said projected image are made common.

21. A projection television receiving apparatus for projecting an image on a surface, comprising:
- means for generating said image according to a video signal;
- means for projecting said image on a focal plane, said projecting means comprising a projection lens system;
- means for detecting the deviation of said focal plane from said surface, said detecting means comprising a radiation source for emitting a radiation beam and a photodetector for receiving a reflected beam generated by reflection of said radiation beam by said surface, said photodetector generating a signal corresponding to the incident position of said reflected beam, said radiation beam being directed to said projection surface through said projection lens system; and
- focusing means for shifting said focal plane in response to said signal from said detecting means, thereby bringing said focal plane to a position substantially coinciding with said projection surface, said focusing means comprises a lens driving mechanism for moving said projection lens system along the optical axis of said projecting means, thereby shifting said focal plane.

22. A projection television receiving apparatus for projecting an image on a surface, comprising:
- means for generating said image according to a video signal;
- means for projecting said image on a focal plane;
- means for detecting the deviation of said focal plane from said surface, said detecting means comprising a radiation source for emitting an ultrasonic wave and a photodetector for receiving a reflected beam generated by reflection of said ultrasonic wave by said surface, said photodetector generating a signal corresponding to the incident position of said reflected beam, said ultrasonic wave being directed to said projection surface through said projection lens system; and
- focusing means for shifting said focal plane in response to said signal from said detecting means, thereby bringing said focal plane to a position substantially coinciding with said surface.

23. A projection television receiving apparatus for projecting an image on a surface, comprising:
- means for generating said image according to a video signal;
- means for projecting said image on a focal plane;
- means for detecting the deviation of said focal plane from said surface, said detecting means comprising a radiation source for emitting a radiation beam and a photodetector for receiving a reflected beam generated by reflection of said radiation beam by said surface, said photodetector generating a signal corresponding to the incident position of said reflected beam said said radiation beam being directed to said projection surface through said projection lens system; and
- focusing means for shifting said focal plane in response to said signal from said detecting means, thereby bringing said focal plane to a position substantially coinciding with said surface;
- wherein said image generating means comprises means for supplying visible light, and three liquid crystal light valves for generating said image by modulating said visible light according to said video signal; and
- wherein said supplying means comprises a lamp for emitting white light and an optical arrangement including plural dichroic mirrors for separating said white light into red, green and blue lights and adapted to direct said red, green and blue lights respectively to said three light valves.

24. A projection television receiving apparatus for projecting an image on a surface, comprising:
- supply means for supplying visible light;
- image generating means for generating said image by modulating said visible light according to a video signal, said image generating means comprising first, second and third light crystal light valves;
- means for projecting said image on a focal plane;
- directing means for directing an invisible light to said surface;
- photoelectric converting means for receiving reflected light generated by reflection of said invisible light by said surface and generating a signal corresponding to the position of said surface; and
- drive means for driving at least a part of said projecting means in response to said signal in such a manner that said focal plane substantially coincides with said surface;
- wherein said projecting means comprises a projection lens system, and said directing means is adapted to direct said invisible light to said projection surface through said projection lens system;
- wherein said supply means comprises a lamp for emitting white light and an optical arrangement comprising plural dichroic mirrors for separating said white light into red, green and blue lights and adapted to direct said red, green and blue lights respectively to said first, second and third light valves; wherein said first liquid crystal light valve is adapted to modulate the red light to generate a red image, said second liquid crystal light valve is adapted to modulate the green light to generate a green image; and the third liquid crystal light valve is adapted to modulate the blue light to generate a blus image; and
- wherein said projection lens system is adapted to project said images onto the projection surface in such a manner that said red, green and blue images mutually overlap on said projection surface.

* * * * *